Feb. 26, 1929.　　　　A. G. TONEY　　　　1,703,799
SAFETY INCLINE CAR
Filed May 28, 1927　　　　2 Sheets-Sheet 2

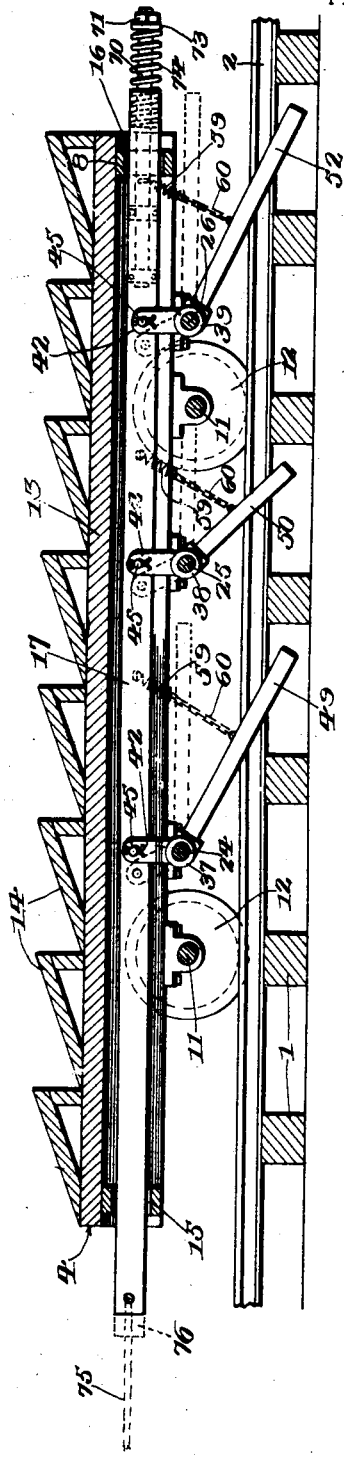

INVENTOR.
Albert G. Toney.
BY
Geo. P. Kimmel.
ATTORNEY.

Patented Feb. 26, 1929.

1,703,799

UNITED STATES PATENT OFFICE.

ALBERT G. TONEY, OF PRAISE, KENTUCKY, ASSIGNOR OF ONE-HALF TO G. B. RACKLEY, OF DUNLEARY, KENTUCKY.

SAFETY INCLINE CAR.

Application filed May 28, 1927. Serial No. 195,078.

This invention relates to cars of that type operating on inclined planes and with the cars lowered by gravity and raised by means of a pulling cable, but more particularly the invention relates to an automatically operable safety brake for the car, and has for its object to provide, in a manner as hereinafter set forth, means operated from the draft bar of the car for impacting against the ties of the track to arrest movement of the car when the pulling cable therefor breaks or becomes slack.

Further objects of the invention are to provide, in a manner as hereinafter set forth, a car of the class referred to provided with a safety device to arrest movement of the car when occasion requires and which is simple in its construction and arrangement, strong, durable, compact, automatic in its action, thoroughly efficient in its use, readily installed with respect to the car, and comparatively inexpensive to set up.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a longitudinal sectional view of a car for use upon inclined planes showing the adaptation therewith of a safety device in accordance with this invention and further illustrating a track in longitudinal section.

Figure 2 is a top plan view of a car with the platform removed, showing the adaptation therewith of a safety device in accordance with this invention.

Figure 3:
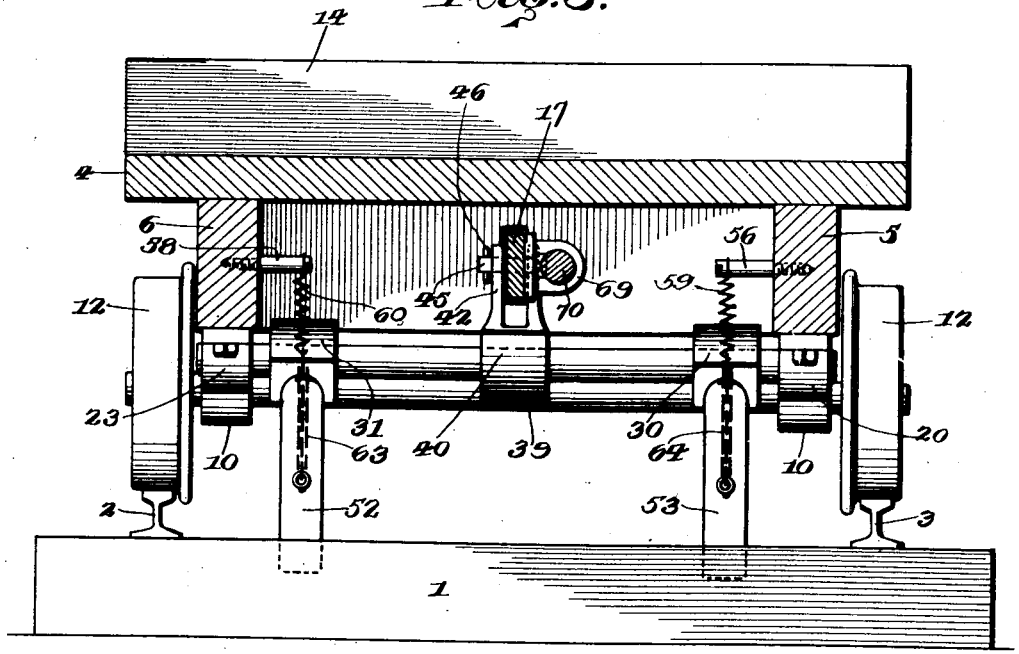
Figure 3 is a cross sectional view of a car and with the same mounted upon a track.
Figure 4:
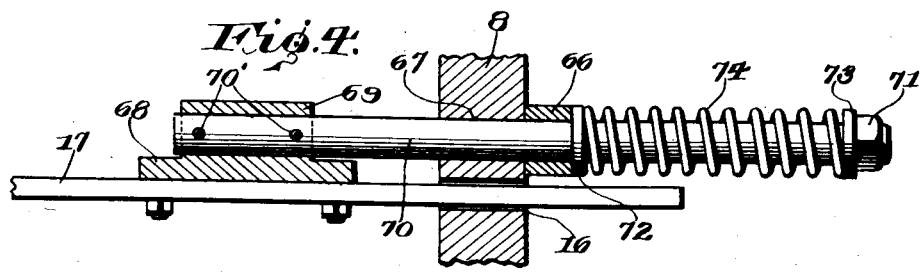
Figure 4 is a fragmentary view illustrating the spring controlling means for the draft bar of the car.

Referring to the drawings in detail 1 denotes a series of spaced ties upon which is secured a pair of track rails 2, 3 which provides the track upon which the car, referred to generally by the reference character 4, travels.

The car 4 comprises a rectangular body portion in the form of a frame and which consists of a pair of side bars 5, 6 and a pair of end bars 7, 8. The end bars 7, 8 are positioned inwardly with respect to the ends of the side bars 5, 6. Each side bar has secured to the lower edge thereof a pair of bearings and the bearings of one pair are indicated at 9 and the bearings of the other pair at 10. The bearings on the side bar 5 oppose the bearings on the side bar 6. Each pair of opposed bearings have journaled therein an axle 11 which projects beyond each of the side bars and has mounted thereon a wheel 12. Mounted on the top of the frame, as well as being secured thereto, is a platform 13 provided with a series of transverse seats 14. The end bar 7, centrally thereof is provided with a transverse opening 15 of appropriate size and the end bar 8 is formed centrally thereof with an opening 16 of appropriate size. The openings 15 and 16 are arranged in alignment and are provided for the passage of a spring controlled draft bar 17 which projects beyond each of the bars 7, 8.

The lower edge of the side bar 5 is formed with a series of spaced bearings, three in number and indicated at 18, 19 and 20. Secured to the lower edge of the side bar 6 is a series of spaced bearings, three in number and indicated at 21, 22 and 23. The bearings 18, 19 and 20 oppose respectively the bearings 21, 22 and 23. Journaled in the bearings 18, 21 is a rock shaft 24. Journaled in the bearings 19, 22 is a rock shaft 25 and journaled in the bearings 20, 23 is a rock shaft 26. The rock shafts extend transversely with respect to the car body or frame and do not project beyond the side bars 5, 6. The rock shafts 24 and 25 are arranged between the axles 11 and the rock shaft 26 is positioned between an axle 11 and the end bar 8.

Keyed to the rock shaft 24 in proximity to the side bar 5 and also in proximity to the side bar 6 is a socket forming member and which are indicated at 27, 28. Keyed to the rock shaft 25 and in proximity to the side bar 5 and side bar 6 is a socket forming member and which are indicated at 28', 29. Keyed to the rock shaft 26 in proximity to the side bar 5 and in proximity to the side bar 6 is a socket forming member and which are indicated at 30, 31. The construction of each of said socket forming members is clearly shown in Figure 6 and each of which consists of a body portion 32 having the forward part thereof provided with an opening 33 for the passage of a rock shaft and with the wall of the opening 33 grooved as at 34, for the reception of a key 35 which extends into the rock shaft. The rear part of the body portion 32 is formed with a socket 36 which opens at the rear end of the body portion 32 and has the wall thereof threaded. The base of the socket 36 is spaced a substantial distance from the opening 33.

Figure 5:
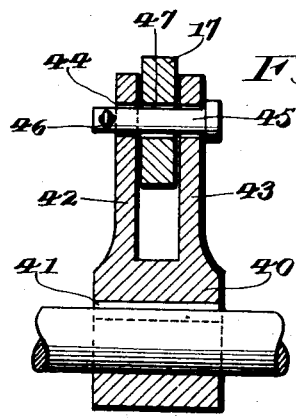
Figure 5 is a fragmentary view in section of one of the brake elements.

Keyed centrally to the rock shafts 24, 25, 26 are respectively bifurcated crank arms 37, 38 and 39 and each of said crank arms consists of a tubular body portion 40, see Figure 5, and which is keyed to a rock shaft as at 41. Formed integral with the body portion 40 and projecting upwardly therefrom is a pair of spaced arms 42, 43 and each of which in proximity to its free end is provided with a slot 44 of appropriate size. The crank arms 37, 38 and 39 extend at opposite sides of the draft or pull bar 17 and are pivotally connected therewith by a headed pin 45 which extends through the arms 42, 43, as well as the draft or pull bar 17 and said pivot pin 45 is detachably connected in position by a cotter pin 46 or other suitable retaining means. The draft bar 37 is provided with slots or openings of appropriate size for the passage of the pins 45 and with reference to Figure 5. one of the openings in shown in the draft bar 17 and is indicated at 47.

Figure 6:
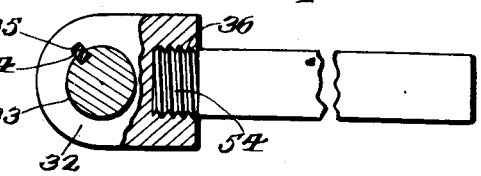
Figure 6 is a fragmentary view, in section, of one of the brake elements taken at right angles of the showing in Figure 5.

Secured in the socket forming members 27, 28 are rearwardly extending brake members 48, 49. Secured in the socket forming member 28', 29 are rearwardly extending brake members 50, 51 respectively, and secured in the socket forming members 30, 31 are rearwardly extending brake members 52, 53 respectively. Each of the brake members with reference to Figure 6 is provided with a threaded terminal portion 54 which engages with the threads of the wall of the sockets 36. The brake members 48, 49 are of greater length than the brake members 50, 51 and the length of these latter are reduced to provide a clearance for the rear axle when said brake members 50, 51 are arranged in inactive position.

Secured to the inner face of the side bar 5 is a pair of spaced inwardly extending lugs 55, 56 and secured to the inner face of the side bar 6 and extending inwardly therefrom is a pair of spaced lugs 57, 58. The brake members 48 and 50 are connected respectively to the lugs 55, 56 by a flexible member 59. The brake members 49, 51 are connected respectively to the lugs 57, 58 by a flexible member 60. Connected to the inner side of the end bar 8 and extending inwardly therefrom are a pair of spaced lugs 61, 62 and the former is connected to the brake member 52 by a flexible member 63 and the latter is connected to the brake member 53 by a flexible member 64. The flexible members 59, 60, 63 and 64 are in the form of chains and couple the brake members with the side bars 5, 6 of the car frame and they further act to limit the lowering movements of said brake members.

Secured to the outer side of the end bar 8 above the opening 16, is a bearing collar 66, and which registers with an opening 67 formed in the end bar 8 above the opening 16. Fixedly secured to the draft bar 17 in proximity to the end bar 8 is a casting 68 provided with a tubular portion 69 arranged in alignment with the opening 67. Associated with the draft bar 17 is a spring controlling device therefor, which not only includes the casting 68, opening 67 and collar 66 but further includes a slidable bar 70 which extends through the collar 66, opening 67 and tubular portion 69. The bar 70 projects rearwardly from the collar 66 and is provided at its outer end with a nut 71 constituting an abutment. Positioned against the collar 66 is a washer 72 and arranged against the nut 71 is a washer 73. Mounted on the bar 70, is a controlling spring 74, and which is interposed between the washers 72, 73. The spring 74 normally functions to shift the draft bar 17 rearwardly and the forward movement of the draft bar 17 is had by the pulling rope which is indicated in dotted lines at 75, Figure 1. The position of the pull bar 17, when the pull rope is taut or when pulling the car up the track is indicated in dotted lines in Figure 1 as at 76 and when in such position the spring 74 is under state of compression and provides a cushioning means for the draft bar. When the draft bar 17 is in the dotted line position shown in Figure 1, the crank arms 37, 38 and 39 will be shifted to the dotted line position thereof as shown in Figure 1 and when in such position the brake members will assume the dotted line position also shown in Figure 1. If the cable 75 breaks or becomes slack, the spring 74 will act to shift the draft bar 17 to the full line position shown in Figure 1, whereby the crank arms 37, 38 and 39 will be shifted to the full line position shown in Figure 1 and the brake members will be lowered to a position between the ties 1, so when the car attempts to slide down the incline the brake members will abut against the ties and arrest the movement of the car. The bar 70 is connected to the casting 68, as at 70'. Any suitable means can be employed for shifting the draw bar forward to hold the retarders up, should the car be switched around on a level grade.

It is thought the many advantages of a safety car, in accordance with this invention, can be readily understood, and although the preferred embodiment of the invention is as illustrated and described, yet it is to be understood that changes in the details of construction can be had which will fall within the scope of the invention as claimed.

What I claim is:

1. A safety braking device for cars drawn by a haulage cable comprising in combination a mobile supporting means, a reciprocal draft bar slidably mounted in said means, extending lengthwise thereof and further projecting from each end thereof, a spring controlled coupling device between said bar and the rear end of said means, said device slidably connected to said means, spaced rock shafts journaled in said means and positioned below said bar, upstanding bifurcated crank arms carried by said shafts and pivotally connected to said bar, a plurality of spaced socket forming members fixed to each shaft, extending rearwardly therefrom and angularly disposed with respect to said crank arms, and a normally elevated brake member connected to each socket forming member, extending rearwardly therefrom and providing a tie abutting means to set up a braking action when the bar is shifted by said spring controlled coupling device.

2. A safety braking device for cars drawn by a haulage cable comprising in combination a mobile supporting means, a reciprocal draft bar slidably mounted in said means, extending lengthwise thereof and further projecting from each end thereof, a spring controlled coupling device between said bar and the rear end of said means, said device slidably connected to said means, spaced rock shafts journaled in said means and positioned below said bar, upstanding bifurcated crank arms carried by said shafts and pivotally connected to said bar, a plurality of spaced socket forming members fixed to each shaft, extending rearwardly therefrom and angularly disposed with respect to said crank arms, a normally elevated brake member connected to each socket forming member, extending rearwardly therefrom and providing a tie abutting means to set up a braking action when the bar is shifted by said spring controlled coupling device, and a flexible member connected to each brake member and to said supporting means for limiting the movement of the brake member from normal position.

3. A safety device for cars drawn by a haulage cable comprising in combination a supporting means provided with front and rear wheels, a spring controlled coupling device between said bar and the rear end of said means, said device slidably connected to said means, spaced rock shafts journaled in said means and positioned below said bar, one of said rock shafts arranged rearwardly of the rear wheels of said supporting means and the other of said rock shafts arranged forwardly of the rear wheels of the supporting means, upstanding bifurcated crank arms carried by said shafts, centrally thereof, and pivotally connected to said bars, a plurality of spaced socket forming members fixed to each shaft, extending rearwardly therefrom and angularly disposed with respect to said crank arms, and a normally elevated brake member connected to each socket forming member, extending rearwardly therefrom and providing a tie abutting means to set up a braking action when the bar is shifted by said spring controlled coupling device.

4. A safety device for cars drawn by a haulage cable comprising in combination a supporting means provided with front and rear wheels, a spring controlled coupling device between said bar and the rear end of said means, said device slidably connected to said means, spaced rock shafts journaled in said means and positioned below said bar, one of said rock shafts arranged rearwardly of the rear wheels of said supporting means and the other of said rock shafts arranged forwardly of the rear wheels of the supporting means, upstanding bifurcated crank arms carried by said shafts, centrally thereof, pivotally connected to said bars, a plurality of spaced socket forming members fixed to each shaft, extending rearwardly therefrom and angularly disposed with respect to said crank arms, a normally elevated brake member connected to each socket forming member, extending rearwardly therefrom and providing a tie abutting means to set up a braking action when the bar is shifted by said spring controlled coupling device, and a flexible member connected to each brake member and to said supporting means for limiting the movement of the brake member from normal position.

In testimony whereof, I affix my signature hereto.

ALBERT G. TONEY.